(12) United States Patent
Ruetenik

(10) Patent No.: US 12,433,254 B2
(45) Date of Patent: Oct. 7, 2025

(54) FLEXIBLE EQUINE ICE BOOT

(71) Applicant: Monty L. Ruetenik, Clear Lake City, TX (US)

(72) Inventor: Monty L. Ruetenik, Clear Lake City, TX (US)

(73) Assignee: Monty L. Ruetenik, Clear Lake Shores, TX (US)

( * ) Notice: Subject to any disclaimer, the term of this patent is extended or adjusted under 35 U.S.C. 154(b) by 41 days.

(21) Appl. No.: 18/597,177

(22) Filed: Mar. 6, 2024

(65) Prior Publication Data
US 2024/0306603 A1 Sep. 19, 2024

Related U.S. Application Data

(60) Provisional application No. 63/490,366, filed on Mar. 15, 2023.

(51) Int. Cl.
A01K 13/00 (2006.01)

(52) U.S. Cl.
CPC .................. A01K 13/007 (2013.01)

(58) Field of Classification Search
CPC .................................... A01K 13/007
See application file for complete search history.

(56) References Cited

U.S. PATENT DOCUMENTS

| 353,428 | A | * | 11/1886 | Purson | ................. | A01K 13/007 |
| | | | | | | 119/673 |
| 593,564 | A | * | 11/1897 | Cane | .................... | A01K 13/007 |
| | | | | | | 54/82 |
| 601,974 | A | * | 4/1898 | Meissner | ............. | A01K 13/007 |
| | | | | | | 54/82 |
| 2,253,837 | A | * | 8/1941 | Augspurger | ............. | A61D 9/00 |
| | | | | | | 54/82 |
| 6,086,609 | A | * | 7/2000 | Buckley | .................. | A61D 9/00 |
| | | | | | | 607/104 |
| D565,256 | S | | 3/2008 | Ruetenik | | |
| D616,614 | S | | 5/2010 | Ruetenik | | |
| 8,166,734 | B2 | | 5/2012 | Ruetenik | | |
| 8,220,231 | B2 | | 7/2012 | Ruetenik | | |
| 8,291,683 | B2 | | 10/2012 | Ruetenik | | |
| D709,656 | S | | 7/2014 | Ruetenik | | |
| 9,055,732 | B1 | | 6/2015 | Ruetenik | | |
| D743,637 | S | | 11/2015 | Ruetenik | | |
| D746,519 | S | | 12/2015 | Ruetenik | | |
| D831,900 | S | | 10/2018 | Ruetenik | | |
| D831,903 | S | | 10/2018 | Ruetenik | | |

(Continued)

FOREIGN PATENT DOCUMENTS

| DE | 29919155 U1 * | 2/2000 | ......... A01K 13/007 |
| WO | 2006025864 A1 | 3/2006 | |

(Continued)

Primary Examiner — Magdalena Topolski
(74) Attorney, Agent, or Firm — Boulware & Valoir PLLC

(57) ABSTRACT

This invention describes an equine cooling boot assembly useful for treatment of lameness, including laminitis and performance stress for equine hooves and legs. The invention relates to an assembly for cooling the leg(s) and hooves of equine and other hooved animals in a coolant bath that provide support for the underside of the hoof and means for retaining the boot on an equine leg. Method to apply cooling to an equine hoof and leg is also described.

18 Claims, 9 Drawing Sheets

(56) References Cited

U.S. PATENT DOCUMENTS

| | | | |
|---|---|---|---|
| 10,154,938 B2 * | 12/2018 | Ruetenik | A61F 7/10 |
| 10,375,946 B2 | 8/2019 | Ruetenik | |
| 11,751,553 B2 * | 9/2023 | Kilbey | A01K 13/007 |
| | | | 168/2 |
| 12,201,554 B2 * | 1/2025 | Orr | A61F 7/103 |
| 2015/0119772 A1 | 4/2015 | Ruetenik | |
| 2017/0280682 A1 | 10/2017 | Ruetenik | |

FOREIGN PATENT DOCUMENTS

| | | | |
|---|---|---|---|
| WO | WO-2015006818 A1 * | 1/2015 | A01K 13/007 |
| WO | WO-2021258168 A1 * | 12/2021 | A01L 15/00 |

* cited by examiner

FLEXIBLE EQUINE ICE BOOT

PRIOR RELATED APPLICATIONS

This application claims priority to U.S. Ser. No. 63/490,366, filed Mar. 15, 2023, and incorporated by reference in its entirety for all purposes.

FEDERALLY SPONSORED RESEARCH STATEMENT

Not applicable.

FIELD OF THE DISCLOSURE

This invention relates to an ice cooling boot assembly useful for treatment of lameness, including laminitis and performance stress for equine hooves and legs. Specifically, it relates to a cooling boot plus orthotic pad assembly and method to apply cooling to an equine hoof and leg. Although designed for equine feet, it is easily modified to fit other four-legged animals, such as bovine, ovine, porcine, etc. by changing the size and shape of the boot.

BACKGROUND OF THE DISCLOSURE

It is known that cold therapy (cryotherapy) is helpful in preventing injury in equines before and after stressful activity and in treating laminitis. As stated by Gil Merrick "It's called high performance for a reason, and the demands on the horses are high. On the international stage where therapeutic medication is not allowed to help with recovery or minor pain relief, icing is the primary way to maintain the horses' comfort and performance." Jennifer M. Keeler, Ice Down To Ride On, The Chronicle of the Horse; Sep. 9, 2013 (www.chronofhorse.com). Also see E. R. Hunt, Response of Twenty-seven Horses with Lower leg Injuries to Cold Spa Bath Hydrotherapy: Journal of Equine Veterinary Science; Volume 21, Number 4, 2001, p 188-193.

Equine ice spas have therefore become popular and been shown to be very beneficial in preventing and treating soreness and damage in equine legs and laminitis in the hoof. Ice spas are characterized by a reservoir of chilled coolant (almost universally water), usually containing sea salt and optionally magnesium salt, sometimes into which oxygen (air) is continuously injected for oxygenating the coolant and providing a massage effect. Generally, the coolant is circulated through a refrigeration unit to maintain its low temperature.

Current commercial spas are large, expensive, walk-in units that are immobile. The large commercial spas contain large volumes of water, which is typically recycled so as to maintain the salts. The horses are fitted with manure bags to aid in keeping the spa clean, but even so the spa water must be filtered and chlorinated for recycling. This is expensive and unlikely to be completely effective in removing fungi and other harmful contaminants.

Thus, there is need in the art for portable ice spas or boots. The ideal portable ice boot would be lightweight, portable, usable even where there is no electrical power, easily cleaned and provide an orthotic hoof support not available in any currently available systems.

SUMMARY OF THE INVENTION

Generally speaking, the invention is a portable ice boot that is configured to fit on an animal leg, such as a horse or other performance animal. The boot comprises a generally cylindrical fabric reservoir designed to hold fluid and is fitted into a sole plate that protects the bottom of the boot from wear. Inside the boot is positioned a soft gel orthotic insert that cushions the animal's hoof. The top of the boot is preferably reinforced, and has attachment means for attachment to a separate harness that serves to hold the boot up. Also, the inside of the boot preferably has an ankle collar to firmly affix the boot around the hoof. The ankle collar may be affixed, or it is preferably removably attached. The boot may also be equipped with a port low on the boot so that air may be bubbled up from the bottom while in use.

Typically, the fabric is quite flexible, and the overall shape is preferably slightly conical—or at least bigger at the top allowing the fabric to be pushed down for easy insertion of an animal's foot. In all embodiments, the reservoir is semi-permeable, allowing slow leakage of fluid, which helps to cool the boot via evaporative cooling. This is quite different from existing ice boots which are impermeable. In some embodiments, the fabric is more permeable at the top than at the bottom.

The invention includes any one or more of the following embodiment(s) in any combination(s) thereof.

---

An ice boot, sized and shaped to fit over a leg of an animal and comprising:
- a) a generally cylindrical and flexible water permeable reservoir for containing coolant;
- b) said reservoir having attachment means at a top end thereof for attaching to a separate harness;
- c) a sole plate having a solid bottom and side walls circumnavigating said bottom;
- d) a bottommost surface of said reservoir or a bottom side surface of said reservoir or both surfaces of said reservoir being attached to an inner surface of said sole plate; and
- e) a shock absorbing orthotic pad removably attached to an inner bottommost surface of said reservoir.

An ice boot, sized and shaped to fit a leg of an animal and comprising:
- a) a conical reservoir for containing coolant, said reservoir comprising a flexible water semi-permeable fabric;
- b) the reservoir having a top end and a bottom end;
- c) a reinforced rim at a top end of said reservoir, said rim having attachment means for attachment to a separate harness;
- d) a sole plate having a solid bottom configured to fit under said animal's foot, said bottom having side walls circumnavigating said bottom;
- e) a bottommost surface of the reservoir or a bottom side surface of said reservoir or both surfaces of the reservoir being attached to an inner surface of said sole plate;
- f) a shock absorbing orthotic pad removably attached to a bottommost inner surface of the reservoir;
- g) an ankle collar removably attached to a bottom side inner surface of the reservoir, said ankle collar configured to reversibly close around an ankle of said animal when said ice boot is in use; and h) a one-way port for connection to an air source low on an exterior surface of the reservoir.

An ice boot described herein, further comprising:
 a) an ankle collar attached to a bottom side inner surface of the reservoir, said ankle collar configured to reversibly close around an ankle of said animal when said ice boot is in use;
 b) a reinforced upper rim on said reservoir for supporting said attachment means;
 c) a one-way port for connection to an air source low on an exterior surface of the reservoir; and
the reservoir comprises a UHMWPE fabric, having a top end and a bottom end, said bottom end being coated with a resin.

An equine ice boot, comprising a flexible reservoir for containing coolant attached to an inner surface of a solid sole plate and a shock absorbing orthotic pad reversibly attached to an inner bottommost surface of said ice boot;
 a) said reservoir comprising:
   i) fabric side walls with an open top and having an upper section and a lower section, wherein said upper section is of wider diameter than said lower section such that said upper section can be folded down over said lower section;
   ii) wherein said lower section is less permeable to water than said upper section and said upper section is semi-permeable to water; and
   iii) wherein said upper section is reinforced near a top end thereof, and comprised fasteners or other attachment means for attachment to a separate harness;
 b) said sole plate comprising:
   i) a solid bottom and solid side walls, and
   ii) at least said fabric side walls being attached to an inner surface of said sole plate.

Any ice boot herein described, wherein said orthotic pad is at least ½ inch thick, and has a harness of about 10-40 Shore A.

Any ice boot herein described, wherein the reservoir is more permeable to water at a top end than at a bottom end.

Any ice boot herein described, wherein the reservoir comprises ultra-high molecular weight polyethylene (UHMWPE) and the bottom end is coated with a resin.

Any ice boot herein described, wherein the reservoir comprises ripstop ultra-high molecular weight polyethylene (UHMWPE) and the bottom end is coated with a polyurethane.

Any ice boot herein described further comprising an ankle collar attached to a bottom side surface of the reservoir, said ankle collar configured to reversibly close around an ankle of said animal when the ice boot is in use.

A method of treatment of a hooved animal leg with cryotherapy treatment, comprising fitting a leg of an animal that will benefit from cryotherapy treatment into the ice boot described herein, attaching said attachment means to a separate harness, and filling said ice boot of with coolant comprising ice and optionally salt for sufficient time to cool said leg.

The following abbreviations and or definitions may be used herein:

Kevlar ® (para-aramid) is a strong, heat-resistant synthetic fiber, related to other aramids such as Nomex ® and Technora ®. Similar to Twaron ®.
Nylon = is a family of synthetic polymers with amide backbones, usually linking aliphatic or semi-aromatic groups.
PE = polyethylene
Polyester = a fabric made from polyethylene terephthalate; polyester is a PE derivative.
PU = polyurethane
Ripstop fabrics are woven fabrics, often made of nylon, using a reinforcing technique that makes them more resistant to tearing and ripping.
During weaving, stronger (and often thicker)
reinforcement yarns are interwoven at regular intervals in a crosshatch pattern. The intervals are typically 5 to 8 millimeters (0.2 to 0.3 in). Thin and lightweight ripstop fabrics have a two-dimensional structure due to the thicker yarns being interwoven in thinner cloth. Older lightweight ripstop fabrics display the thicker interlocking thread patterns in the material quite prominently, but more modern weaving techniques make the ripstop threads less obvious. A similar effect can be achieved by weaving two or three fine yarns together at smaller intervals. Ripstop is often nylon or polyester, but ripstop fabric can also be made from other materials like polypropylene, polyethylene, and even high-performance fibers like Kevlar ® and Dyneema ®.
UHMWPE = ultrahigh molecular weight PE
Zylon ® = poly(p-phenylene-2,6-benzobisoxazole) aka PBO. Zylon has 5.8 GPa of tensile strength, which is 1.6 times that of Kevlar ®. Additionally, Zylon ® has a high Young's modulus of 270 GPa, meaning that it is stiffer than steel.
As used herein, Velcro is any hook-and-loop fabric allowing reversible connection of any parts the Velcro patch is affixed to. At least 20 patches are needed, one with hooks and the other with loops, but an even stronger connection is possible with three pieces, the centerpiece being double sides, so the other two pieces bracket the center piece.
As used herein, any fastening means to attach two materials together (e.g., reservoir and sole or ankle collar to boot) can be used, provided suitable for the materials and shapes in use. These, include e.g., heat welding, laser welding, RF welding, pressure welding, chemical bonding, glues and adhesives, embedding in resin, dipping in resin, screws, nuts and bolts, rivets, snap-fit connectors, sewing, and the like, plus combinations thereof. Where reversible attachments are needed, Velcro is preferred. For permanent attachment, glue and/or sewing are preferred.
The attachment means for the harness to boot connection are preferably, but not necessarily, reversable. These include hooks and holes, rings or other hooks, clips, pins, Velcro, snap-fit connectors such as buckles and the like. Preferred means are lockable hooks so that the hooks are not easily dislodged.

As used herein, "generally cylindrical" allows the top end to be slightly larger than the bottom, for compact collection of the walls, whereas cylindrical is the same size throughout the length. The walls can be "slightly conical"-being larger at the top, or they may be stepped-the upper portion larger than the bottom. A conical shape is preferred, with the top being 1-2 inches larger the bottom, a greater increase in size needed for a longer boot. All that is needed, is enough spread to allow the walls to be collected at the base and allow easy ingress to the inner bottom surface of the boot.

As used herein, a "flexible" fabric is sufficient flex to allow the boot walls to be pushed to the base, allowing access to the inner bottom surface of the boot. It is known how to balance strength against flexibility, and lighter weight fabrics are typically more flexible than heavy weight.

As used herein, to be "near" the top or bottom of a boot is to be within about 0-3 inches of the edge.

DESCRIPTION OF THE FIGURES

The FIGURES represent embodiments and aspects of the invention and are not intended to be limiting of the scope of the invention.

DETAILED DESCRIPTION

Figure 1A:
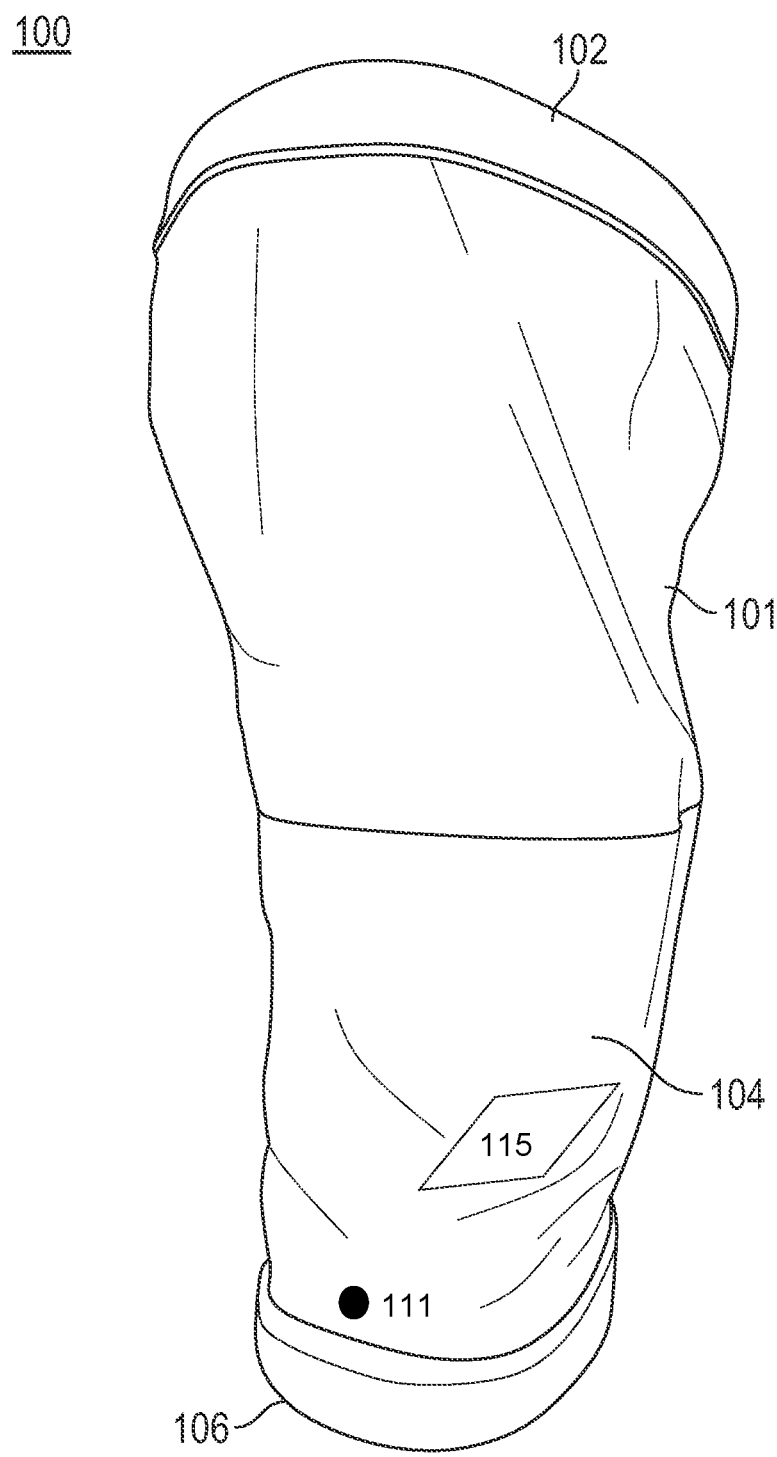
FIG. 1A is an exterior perspective of an ice boot.

The present invention is an ice boot assembly and system for cooling the legs of equine and other four-legged hooved animals. The ice boot assembly (spa) consists of a reservoir for containing coolant with a shock adsorbing elastomeric pad disposed in the bottom of the reservoir. The reservoir is protected from wear and tear by an exterior sole plate on the reservoir at the bottom thereof. The sole plate is resin and much tougher than the fabric.

The boot may also have an ankle collar inside, near the bottom, to secure to boot to the horse's ankle, so there is little or no displacement when the horse raises a foot. There may also be means for injecting air or other gas into the reservoir of the boot, thus providing a massaging action as air bubbles upwards.

In one embodiment, the ice boot assembly of this application is a flexible fabric equine boot having two different semipermeable zones. A top or upper zone that is somewhat water permeable (porous) and a bottom zone that has much less permeability (porosity) than the top (upper zone) zone.

The semi-permeability of the upper zone allows excess water to drain out as the ice melts. The bottom zone's height is approximately sufficient to reach an equine limb mid cannon bone. This allows the bottom zone to retain an ice/water slurry zone that has proven to be required for the most efficient lamella cooling protocol.

Potentially added to the boot is a string or strap closure on the top section that allows the upper section to be adjustably tightened around the leg to keep the ice and water from spilling out when the equine lays down. A string can circumnavigate the top and be shortened to gather the boot top, or a strap and buckles or clips may be used instead.

Where the upper rim is reinforced, it will be less flexible. Thus, an extra length of flexible fabric above the rim may be used for gathering with a string or strap, leaving the rim fully expanded and attached to the harness. If desired, this ring of fabric may be sewed to the boot and be more flexible (lighter weight) than the remainder of the fabric.

Prototype boots have a height of about 18 to 24 inches with about 20 inches preferred and a bottom diameter of about 6-7 inches and top diameter of about 8-12 inches. These dimensions are illustrative only and may vary as desired. Boots for donkeys and ponies will be smaller than boots for Arabs and quarter horse, which in turn will be smaller than boots for draft horses. Shape may also vary depending on hoof shape, and with the animal being treated.

In one example, the top more porous section of the boot (upper zone) will be about 10-11 inches tall and the lower section (also termed the ice slurry zone), is coated to reduce porosity or be made of a non-porous material and will be about 9-10 inches in height. The combined length of the two zones of about 20 inches. The zones are easily constructed from a single sheet of permeable fabric in which the lower section is coated with a polyurethane or other resin coating to greatly reduce or even eliminate water permeability under the short times in use, but different materials can also be combined.

In the upper zone and potentially in the lower zone, water can continually seep out, coating the outside of the boot fabric with water. However, due to the dual porosity zone design of this invention, water drains more quickly from the upper zone and enables melting ice in the upper zone to continually feed the lower ice slurry zone while enabling the upper zone excess water to self-drain through the pores in the fabric. The variable permeability of the system keeps the upper distal limb wet while enabling the excess water to be slowly released thereby eliminating excess weight of water in the system. In warmer climates or warm rooms, the continual draining of water along the outer surface allows evaporative cooling of the boot and provides insulation to help slow the melting of the ice.

One advantage of the flexible fabric design is that the ice reservoir of the boot may be folded down, so the walls are bunched at the bottom of the boot, which allows the equine leg to be easily fitted thereinto. In use, the boot walls are rolled down and the orthotic insert is added to the boot (unless already present). The orthotic insert is typically removably attached with Velcro, but other reversible attachment means could be used. The insert can even be affixed inside the boot.

The horse's foot is placed thereinto, and the ankle collar closed around the ankle. The walls of the boot are then lifted up and secured to a harness on the horse. Coolant is then added to the boot, and if present, the top of the boot may be tightened via gathered string or latched straps to keep ice well contained.

If air is to be bubbled though the boot, then a hose is connected to the boot via a suitable one-way port near the bottom and an air source (pump) and run, thus also providing a massage effect while in use. An air pump such as those available for hydroponics and weighing about 4-8 pounds works well. The air pump is preferably battery operated but could be fitted with a connection for an external power source. In one aspect, the air pump will have four air outlets to accommodate spas on four hooves. It will be housed in a watertight housing and adapted to be hung onto an equine withers with a strap or harness such as a surcingle.

Coolant may be as simple as crushed ice in water, which in the open top boot will be very suitable and is preferred. Other coolants may also be used, particularly if the coolant is externally cooled and circulated in the coolant bag or boot. Suitable coolants should have good thermal conductivity, a low flash (or vaporization temperature) point, be non-corrosive, inexpensive and readily available and be able to dissolve sea salt and/or magnesium salts. Some useful coolants include, but are not limited to chilled water, ethylene glycol, propylene glycol, methanol/water, ethanol/water, calcium chloride solution, potassium formate/acetate solution. The choice of coolant can also be made to affect the temperature of the coolant. Temperatures to which the hoof can be cooled are not extreme—e.g. it is unlikely that the temperatures below about 0° F. will be desirable and then only if the coolant is not in direct contact with the skin. Generally, coolants will be above about 32° F. (0-4° C.).

Water with ice is the preferred coolant since the spa is intended to be portable and ice is readily available and inexpensive. A refrigerant means for chilling and circulation coolant is acceptable and within the scope of the invention, but less portable, more expensive and requires an external source of electric power. Ice and water require no electric power and allows greater portability for the apparatus.

The boot also has an exterior sole plate that is not fabric, but typically resin, and that functions to protect the fabric from wear and tear. It consists of a base and walls circumnavigating said base. The sole plate is made separately, and attached to the fabric with glue, sewing, rivets, nuts and bolts, RF welding, embedding in the resin while still liquid, dipping in liquid resin, and any other suitable fastening means. Suitable and effective sole plates are described in more detail in U.S. Pat. No. 8,220,231, US201100673661, USD565256 and USD616614, and the optional rocker attachment as described in US20110067366.

The sole plate is desirably sloped front to back on the bottom surface or has a rocker surface (convex) to provide an easy break-over as is described in the patents and applications disclosed herein. The sloped sole allows a whole roller motion of the sole to eliminate tearing and trauma of a horse moving or turning. It relieves stress on the deep digital flexor tendon. This can be especially important because of the extra weight of the water filled boot.

The sole plate also helps to hold the orthotic pad in position inside the boot and on the hoof and is thus preferably walled around the entire circumference. The walls prevent the hoof sliding forward or rearward while in use, and also confines the orthotic pad. If a relatively "soft" pad is used (as is usually desirable) the weight of the horse will flatten the pad and, if there were an opening in the walls of the sole plate, the pad would be extruded out the opening.

The fabric portion of the boot may be open at the top and bottom such that just the bottom side edges of the fabric are attached to the sole plate. Alternatively, it may be closed at the bottom and cover the entire inner surface of the sole plate 106 (in FIG. 1A-B). A preferred embodiment has a closed bottom, which provides a convenient surface for sewing a Velcro patch for attachment of the orthotic insert.

Attachment of the reservoir to the sole plate is preferably accomplished by either an adhesive and/or mechanical means. For example, the sole plate may be first attached by a suitable adhesive, then sewn to the lower portion of the cloth reservoir. Sewing of the sole plate is done using the sewing machines used in shoe or boot manufacturing that sew leather soles onto boots.

It has been found that two rows of stitching are especially preferred to prevent the sole from coming detached from the fabric upper during use, and a double row of stitching was used in our prototypes. This is typically done by using two molded sewing channel that follow around so that the needle holes do not overlap and create perforations or weak spots. However, any fastening means may be used, include adhesive, sewing, rivets, screws, nuts and bolts, RF welding, embedding of the fabric in the resin before the resin cures, dipping of the fabric in resin, or any fastening means discussed herein and combinations thereof.

The soft orthotic pads should generally extend to the edges of the inside walls of the sole plate and generally reflect the shape of the animal's foot. For example, Arabian horses generally have more elongated hooves than Quarter horses. It has also been found that the shape of the pad is important for its therapeutic efficacy; rocker pads and sloped pads being useful for certain conditions. Moreover, more elongated oval shapes are especially useful in laminitis affected horses, where the hoof is tilted downward because of the abnormal growth rates of the hoof walls caused by the compromised tubules of the laminae. Pads (and sole plates) with a relatively wide heel section allow better rocker action and better flow of coolant around the hoof.

The orthotic pad may be made of any suitable shock absorbing material such as elastomeric polymer material that provides flexibility, shock absorbency, some degree of elasticity, resilience and has dimensional stability. Polyvinyl chloride PVC, polysilicon and similar elastomers are suitable. In a preferred embodiment, the pad is constructed of a cast polyurethane elastomer. For example, polyurethane-casting elastomer having a Shore 22. A hardness of from about 0 to about 50 is acceptable. Ideal standard orthotic material has a Shore A of about 22, while for ice boot material with Shore A of about 14-18 are preferred.

In most cases it is desirable that the orthotic pad be a relatively soft and deep elastomer, Shore 00 of 5 to 60, and of about 0.50 to 2.0 inches thickness. This deep soft pad is especially useful where the hoof is damaged or diseased. The soft pad will conform to the shape of the hoof and reshape itself as the horse shifts its weight since the pad is soft and pliable and constrained by the wall of the boot, e.g. the sole plate wall providing not only good support but a massaging action.

The orthotic pads may be single density or dual density. In a dual density pad the front and rear section will have Shore 00 hardness between 5 and 70 but will be different front and rear. For example, a dual density pad may have a front section of Shore 00 hardness of 30 and a rear section hardness of 60 Shore 00. Or, conversely, it may have a front section hardness of 50 and a rear section hardness of 20 Shore 00. Suitable single and dual density pads are described and illustrated in U.S. Pat. Nos. 7,445,051, 8,220,231, USD616614 and USD29/454,564.

The choice of hardness and the arrangement in the dual density orthotic pad is determined by the desired outcome. For example, if it is desirable to have the hoof tip or lean forward then a softer front section would be indicated. The principal importance of the soft deep pad is that it lets the horse seek the most comfortable position for the hoof and thus minimize stress and damage. Coupled with a cooling boot, the deep soft pad provides excellent rocker ability and has been found to be especially efficacious in horses with damaged hoofs—such as in laminitis.

While the orthotic pad may be mounted inside the boot at its base with any fastening means, removable fastening means are preferred, and our protypes use Velcro. When the mating hook-and-loop (Velcro) straps are connected, it prevents the pad from rotating in the boot during use. The hook-and-loop straps may be sewn to the boot fabric or attached by adhesive, or both. Attachment of a hook-and-loop strap piece and the appropriate sizes are described U.S. Pat. No. 8,220,231 and US20110279184.

Alternatively, the boot shape can be asymmetrical (e.g. oval or having a tab at the toe, etc.), and thereby prevent rotation of the orthotic insert, or both asymmetry and Velcro may be used. Other attachment means include screws, bolts, rivets, washers, glue, snap fit components (assuming the pad has a hard base that can be molded for snap fit), or any other attachment means discussed herein.

The boot apparatus and method can be used on shod and unshod horses. It will be an advantage in some circumstances to have the hoof shod, all things being equal, since the shoe will allow coolant to contact the sole of the hoof as well as the wall. Plastic or polymer, light weight shoes that can be attached to the hoof without nails (as with an adhesive) may be preferred. However, in most cases the animal will be unshod.

Fabric made from ultra-high molecular weight polyethylene (UHMWPE) is very suitable for the fabric of the boot of this application. These fabrics have a very low coefficient of friction, significantly lower than nylon, and are comparable to Teflon. They are highly resistant to abrasion extremely low moisture absorption. Other suitable fabrics may include Kevlar™, Vectran™, or any polyester of suitable strength. ULTRA 200 or 400 are other options, available from RipStop by the roll. Its weave consists of a 60% ultra-high-molecular-weight polyethylene (UHMWPE)/40% polyester woven face laminated (heated/glued) to a recycled polyester film. This material is inherently waterproof due to it being laminated to a film backing. The high percentage of UHMWPE on the outer face makes it very abrasion resistant.

RipStop also has a 210d UHMWPE gridstop that is 92% nylon of 210 denier/8% UHMWPE ripstop. There is a durable water repellant finish on the outer surface and polyurethane coating inside. Gridstop holds up well to long term use because of its ability to slightly stretch which spreads loads in high stress areas. This gridstop fabric is water resistant but not waterproof.

Other potential fabrics include Cordura® (a nylon or nylon blend), ballistic nylon—a 1050-1680 denier basket weave fabric, or high-performance fabrics such as Dyneema® and Zylon®, especially in ripstop, gridstop, basket weave or high warp/weft ratios which greatly contributes to strength. Dyneema® fabrics are made with UHMWPE. A broad portfolio of constructions using Dyneema® in the warp, weft or both are available with weight options spanning from 25 gr/m2 to 500 gr/m2 and more. Coloring is possible using colored companion fibers. Dyneema® fabrics can also be coated. Zylon® is a thermoset liquid-crystalline polyoxazole fabric that rivals Dyneema in strength.

A Dyneema® fabric was used in the prototypes described herein. This is a ripstop UHMWPE fabric that is 15 times stronger than steel, yet light enough to float on water. The lower section only was coated using elastomeric urethane with a tensile strength of approximately 500 psi to coat/wet out the lower zone making it less permeable thereby holding the ice and water (slurry) in that zone for the most efficient cooling of the lamella tissue within the hoof.

Porosity in the prototype was determined in a 10-minute test. The upper zone allowed 64 ounces of water to drain through an 8-inch×8-inch area of fabric in ten minutes (herein defined as "semi-permeable") and the urethane coated lower zone the same 8-inch×8-inch area allowed 8 ounces of water to seep through in ten minutes. Thus, ideally the upper zone is 5-10× more permeable, or about 8×, than the lower zone.

Referring to FIG. 1A we see a prototype boot that is generally cylindrical, but slightly conical. The top section of the boot (and rim) is preferably sized larger than the sole plate to facilitate folding the boot down to allow the equine leg to be inserted into the leg retaining collar.

In FIG. 1A the boot 100 has a fabric upper section 101 and a coated fabric lower section 104. The lower section 104 is disposed inside sole plate 106, either covering just the inner vertical walls thereof or the entirety of the inner surface of the sole plate. This attachment is preferably permanent. Patch 115 is the sewn outline of a Velcro patch on the inner surface of the boot, that may be used to hold the ankle collar, as discussed below. An optional air hose connector 111 is also seen low on the boot. Rim 102 around the top of the upper section is a strengthened portion of the top end with folded over fabric and/or added layer of fabric, strap, or cord. It provides a strong secure edge that can be attached to a harness.

Figure 1B:
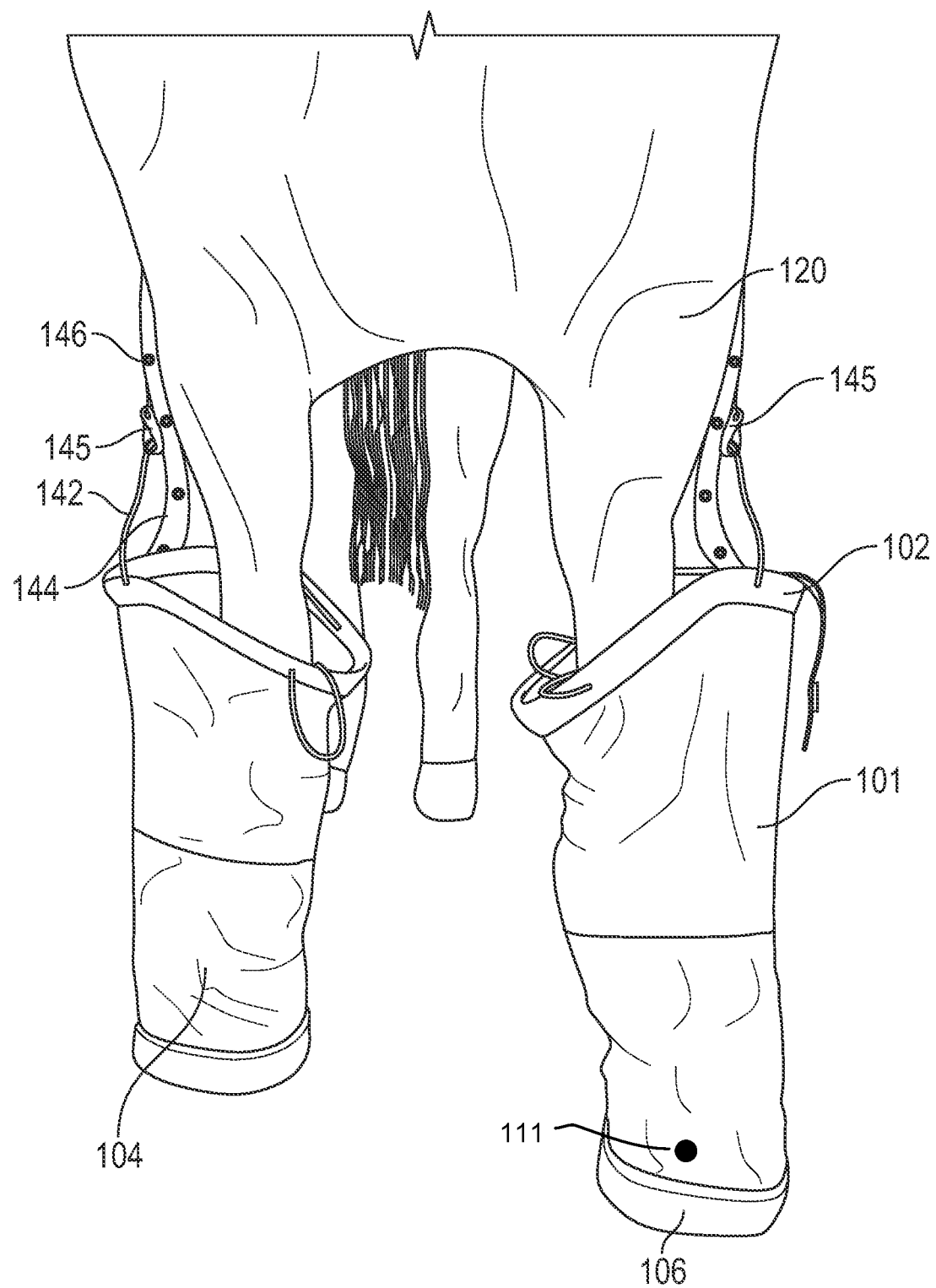
FIG. 1B shows a pair of boots fitted to a horse's front legs and held up by a separate harness.

FIG. 1B shows the boot with a horse leg 120 therein. Rim 102 is seen with attachment means 142 (here loops) that are used to hold the boot up. Optional air hose connector 111 is seen low on the boot. Any harness 144 carried over the horse's back, withers or neck can be used to hold the boot up via reversible attachment means 142.

In FIG. 1B the harness 144 has holes 146 so hooks 145 can be adjusted up or down merely by selecting the hole, and hook 145 catches loop 142. However, the hooks could be on the boot and catch another hook or hole on the harness, or the harness may have a strong clip that grips the rim 102 of the boot or the reverse could be used wherein the boot has the clip that grabs the harness. Hooks are preferred reversible attachment means, especially lockable hooks, such as a carabiner, swivel hook, double end bolt snap hooks, or any hook with a safety buckle.

Figure 2A:
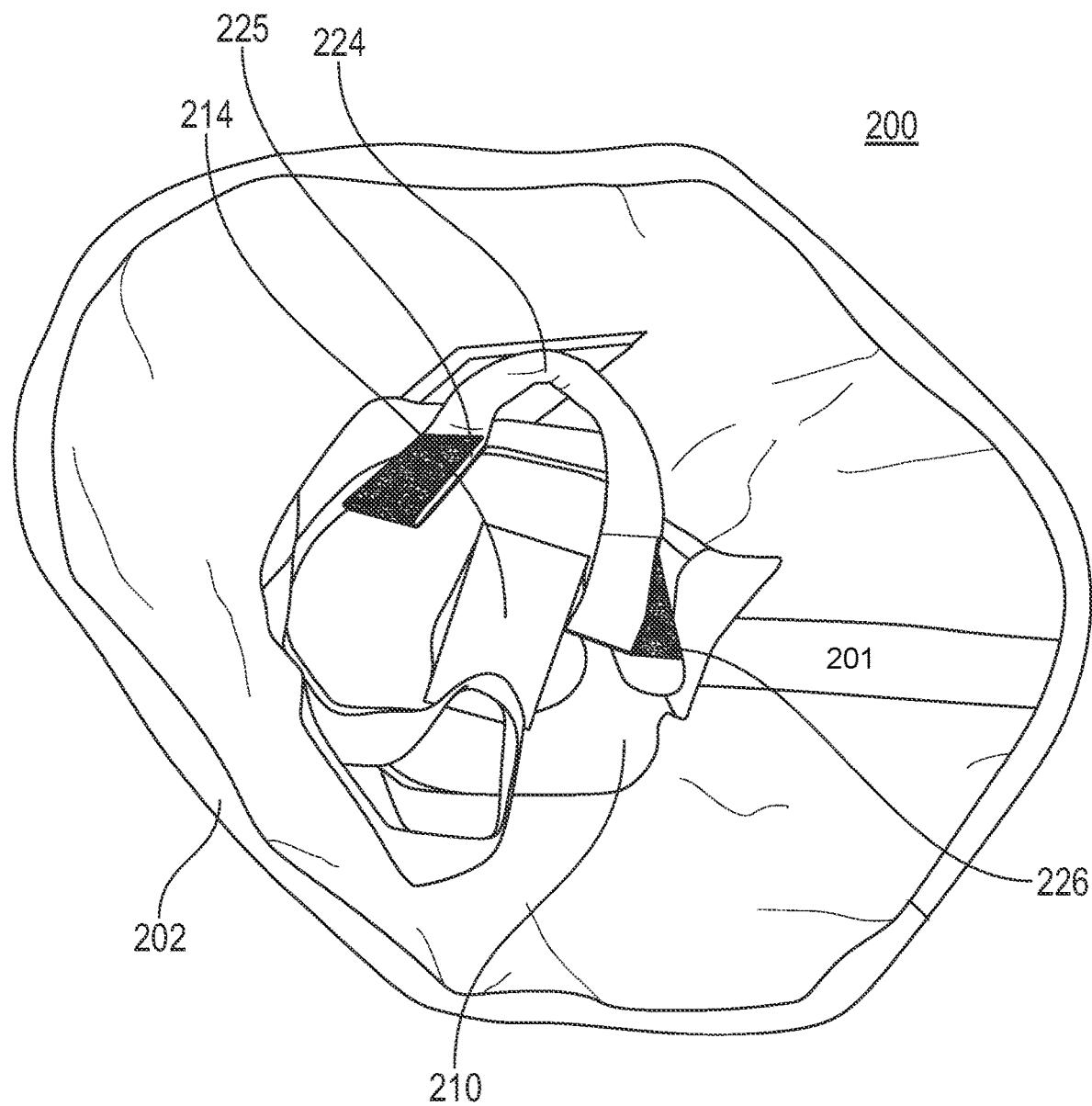
FIG. 2A shows a top down view of one embodiment of the boot, wherein the boot is rolled down for access to a harness or ankle collar inside the bottom of the boot.

FIG. 2A shows the inside of a boot 200 from a top perspective illustrating an ankle grip strap or collar 224 with Velcro ends 225/226 that can be closed around the horse's ankle. The double overlap with Velcro ends is for a small area so that the collar (covered in Dyneema® fabric) is fully encircling the coronet band of the horse's leg so that there is consistent retention and no pressure point. Also seen is a Velcro patch 214 that functions to removably hold a soft orthotic pad insert in place at the base of the boot. Part 202 is the reinforced rim and 210 is the bottom of the reservoir. 201 is a protective strip covering the fabric seam so that it does not chafe.

Figure 2B:
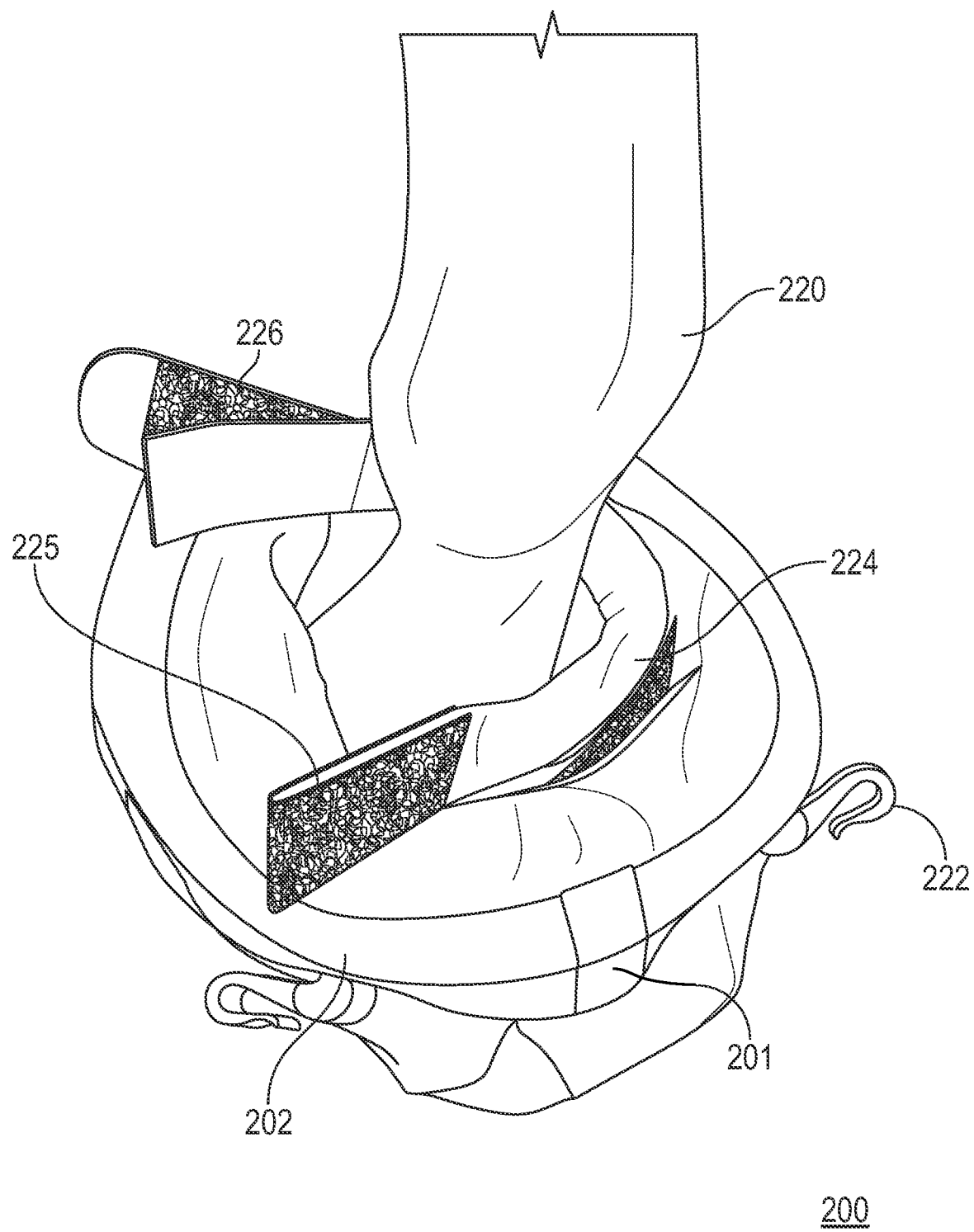
FIG. 2B shows the horses leg inserted into the boot of 2A.
Figure 2C:
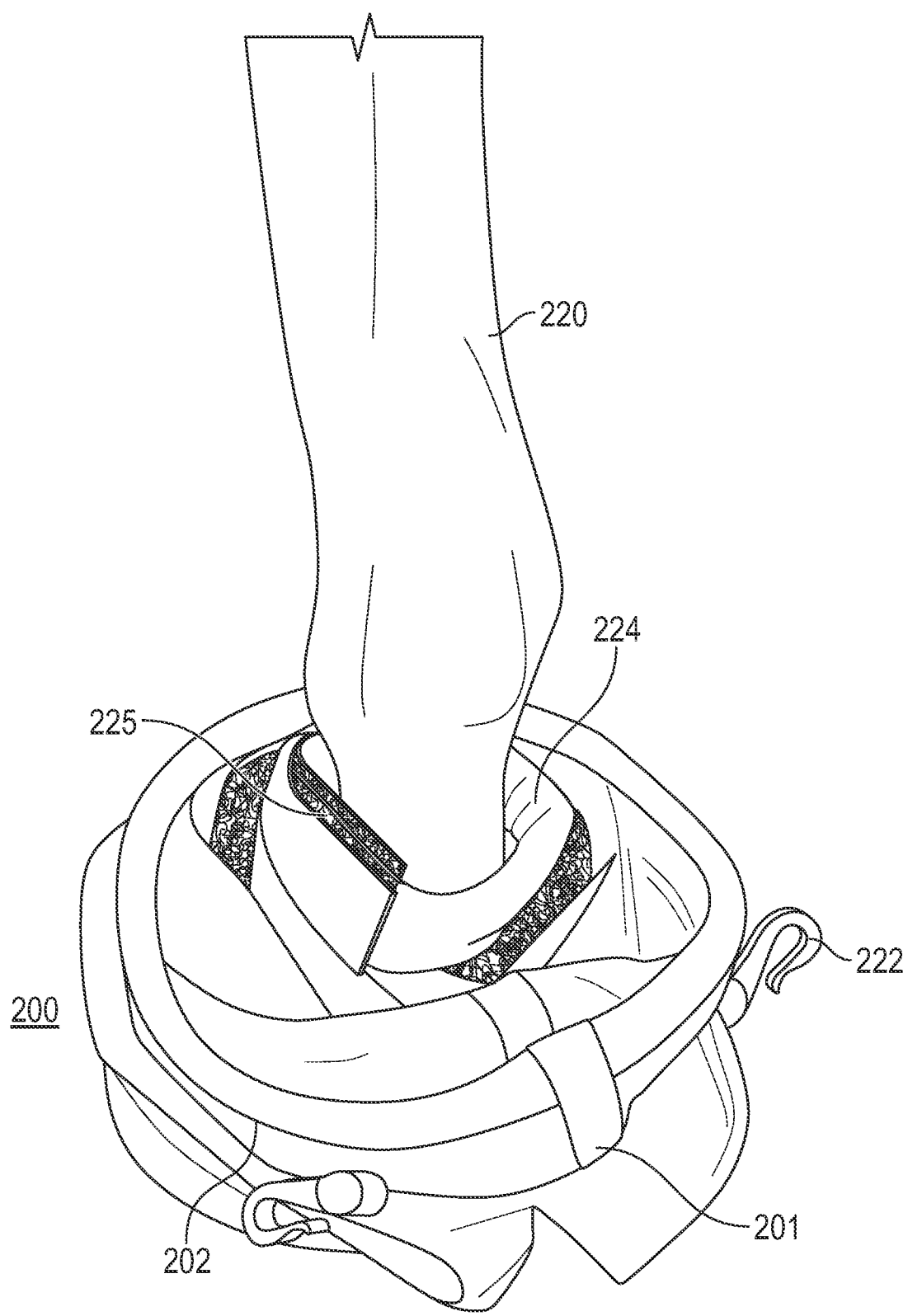
FIG. 2C shows the ankle collar closed via Velcro patches around the horse's ankle.

FIG. 2B shows the horses leg 220 being placed inside the boot and FIG. 2C shows the Velcro closed around the ankle. In this embodiment, the attachment means on the rim are hooks 222 on the ice boot, which can catch a ring, a hole, or another hook on the harness. Not visible in this picture is the orthotic gel insert, but it would be under the hoof providing cushioning for the horse.

Figure 3A:
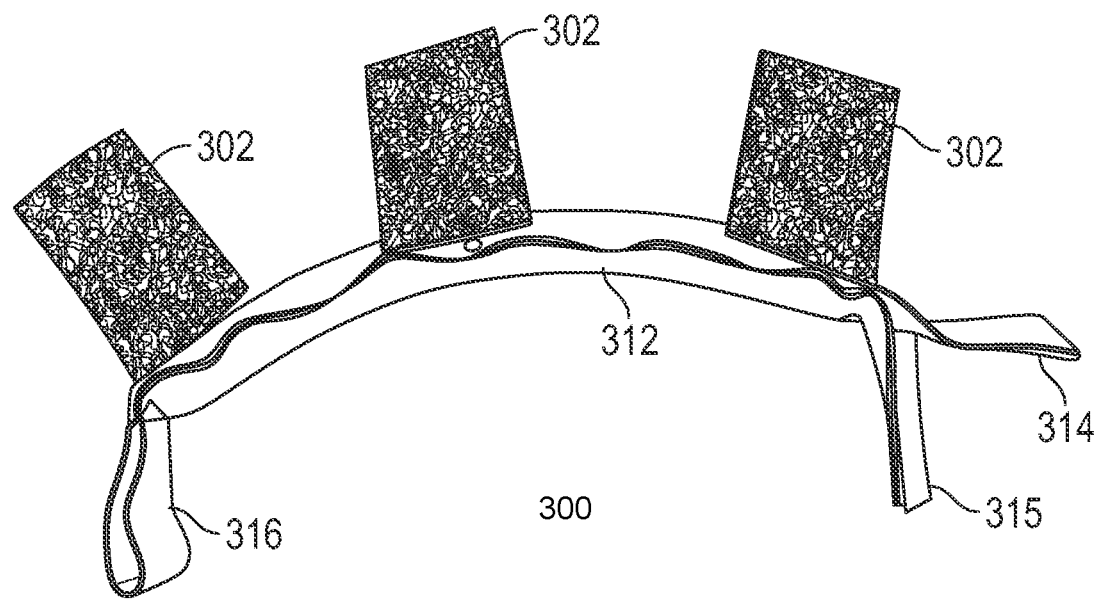
FIG. 3A is a top perspective view of an ankle collar of one embodiment of the invention. Here it is shown separate from the remainder of the boot for clarity.
Figure 3B:
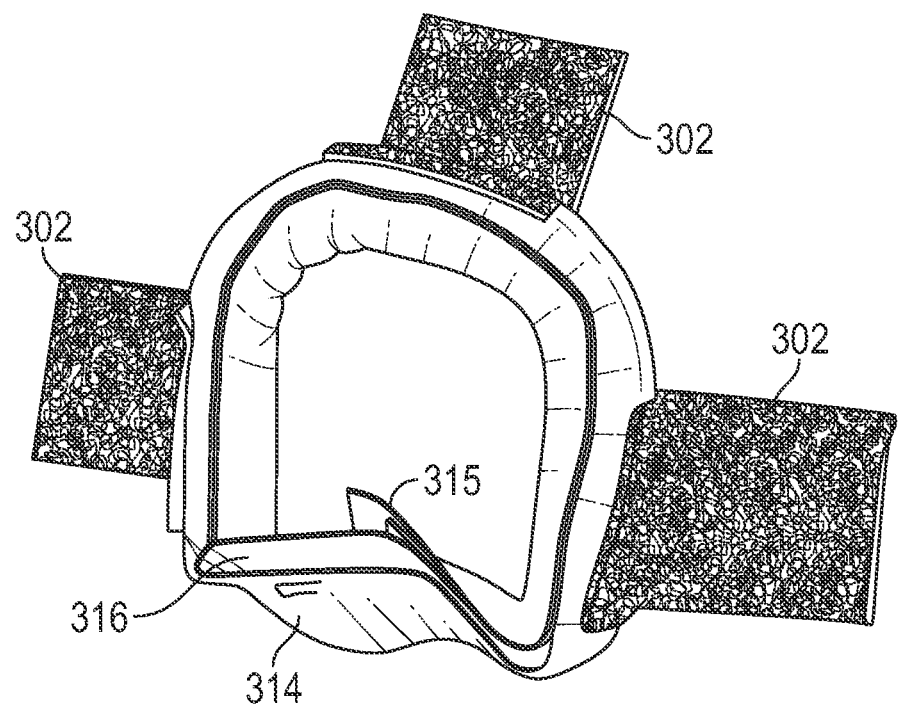
FIG. 3B is another perspective view of the ankle collar of 3A shown in a closed position, such as it would appear when closed over the ankle. The protruding Velcro patches 302 mate with patches on the inner surface of the boot (not shown, but see 115 of FIG. 1A for one example).

One attachment means 300 (referred herein as a hoof retention collar or ankle collar) is detailed in FIG. 3A-C. Shown in soft fabric member 312 to which is attached three hook-and-loop straps 302 for attachment to corresponding Velcro patches inside the boot (not shown but see 115 in FIG. 1A). Thus, the collar 312 can be removed entirely from the boot, which allows easy replacement. The ends of the strap or ankle collar 312 also have Velcro patches, in this case 3 for optimal strength 314/315/316. These Velcro ends 314/315/316 are designed to hold the ankle collar around an equine leg at the ankle.

The collar 312 may be a single layer of strap or fabric but preferably is a folded piece of fabric sewn together and with a foam rope or other soft insert inside to round the collar and thus minimize chafing.

Collar 312 thus provides a removable attachment of the leg to the ice boot so that when the equine lifts its leg the boot will stay connected and the hoof remains in proper position on the orthotic pad (not visible in this figure, but under the hoof attached to Velcro patch 214 of FIG. 2A). This also helps prevent ice getting under the hoof that could cause discomfort when the equine stands.

With the ankle collar hook-and-loop ends open and the ice boot walls folded down the leg is easily guided into the collar and the hoof placed on the gel orthotic. Then the hoof retention or ankle collar is closed thereby keeping the hoof centered on the orthotic. The hook-and-loop connection of the ankle collar to the elastomeric orthotic pad also allows the boot to be removed without removing the collar from the equine leg, thus allowing efficient and quick replacement of the boot exterior if needed.

The ice boot can be one size fits all or be provided in 3-4 sizes. With a one-size ice boot, the ankle collar and orthotic inserts may be provided in differing sizes and switch out for different size animals. This is preferred, as the ice boot is somewhat complex, and the other items are easily provided in differing sizes. Where the one size boot option is used, it will be necessary to ensure the orthotic remains centered, which can be done by adding side wall around the orthotic pad, as seen with the sole plate, or a separate donut shaped adaptor may be provided to take up the exterior space surrounding a smaller orthotic pad.

Figure 4A:
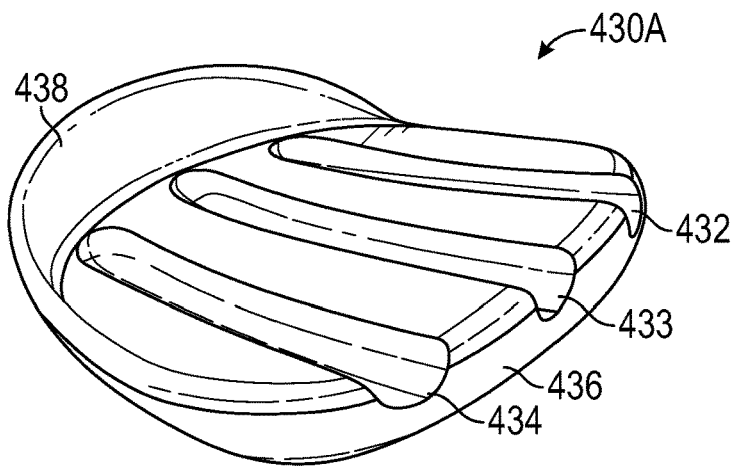
FIG. 4A-C are perspective views of an orthotic pad of one embodiment of the invention. Here grooves for channeling ice water under the hoof are seen.
Figure 4B:
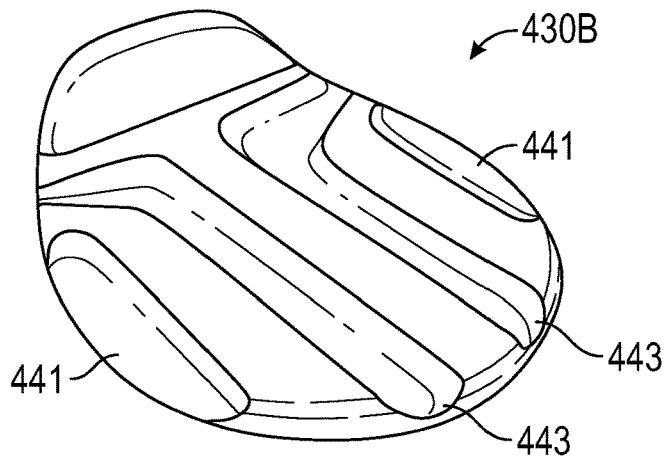
Figure 4C:
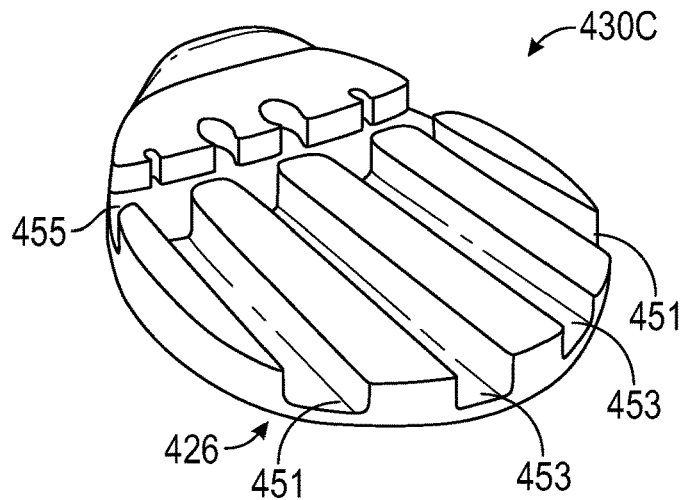

FIG. 4A-C show three orthotic inserts for use with the boot. Orthotic insert 430A in FIG. 4A has grooves 432, 433 and 434 on the upper surface of the pad that will allow ice water to flow through the grooves beneath the hoof. The orthotic pad has a raised front 438 to provide a comfortable cushioned stop for the toe of the hoof.

In preferred embodiments, these grooves are both vertical and horizontal (e.g., placed at different angles) allowing front to back and side to side movement of the ice water. Thus, L shaped, X shaped, H shaped grooves and the like would also be suitable. As the horse shifts its weight the ridges compress and expand (but are circumferentially constrained by the side walls of the sole plate) to provide a pumping action to move the coolant beneath the hoof and to help prevent stagnant warn spots of coolant.

FIG. 4B shows orthotic insert 430B with edge grooves 441 and L shaped grooved 443. FIG. 4C shows orthotic insert 430C with edge grooves 451 and center grooves 453 and cross groove 455 on a bottom surface 426.

The bottom surface 426 has a Velcro patch (not seen herein) to mate with Velcro patch 214, seen in FIG. 2A.

The harness need not be specifically made for this use herein. Thus, an over-girth or surcingle or any existing neck, shoulder or wither collar can be used by adding boot straps. A preferred design for the boot straps has four attachment points (only 3 visible in FIG. 5 as the $4^{th}$ is behind the leg) which helps keep the upper section of the boot centered, enabling feeder ice to be easily added. Generally, the inner straps are longer than the other straps as they have farther to travel from the boot strap to the inside of the legs. This design helps keep the ice boot centered with a horizontal rim so the cooling ice slurry cold therapy can be uniformity is applied to the entire distal limb. Just using 1 or 2 attachment points would allow the rim to tip, dumping water and reducing accessibility to the interior. Thus, 3 or 4 are preferred.

Figure 5:
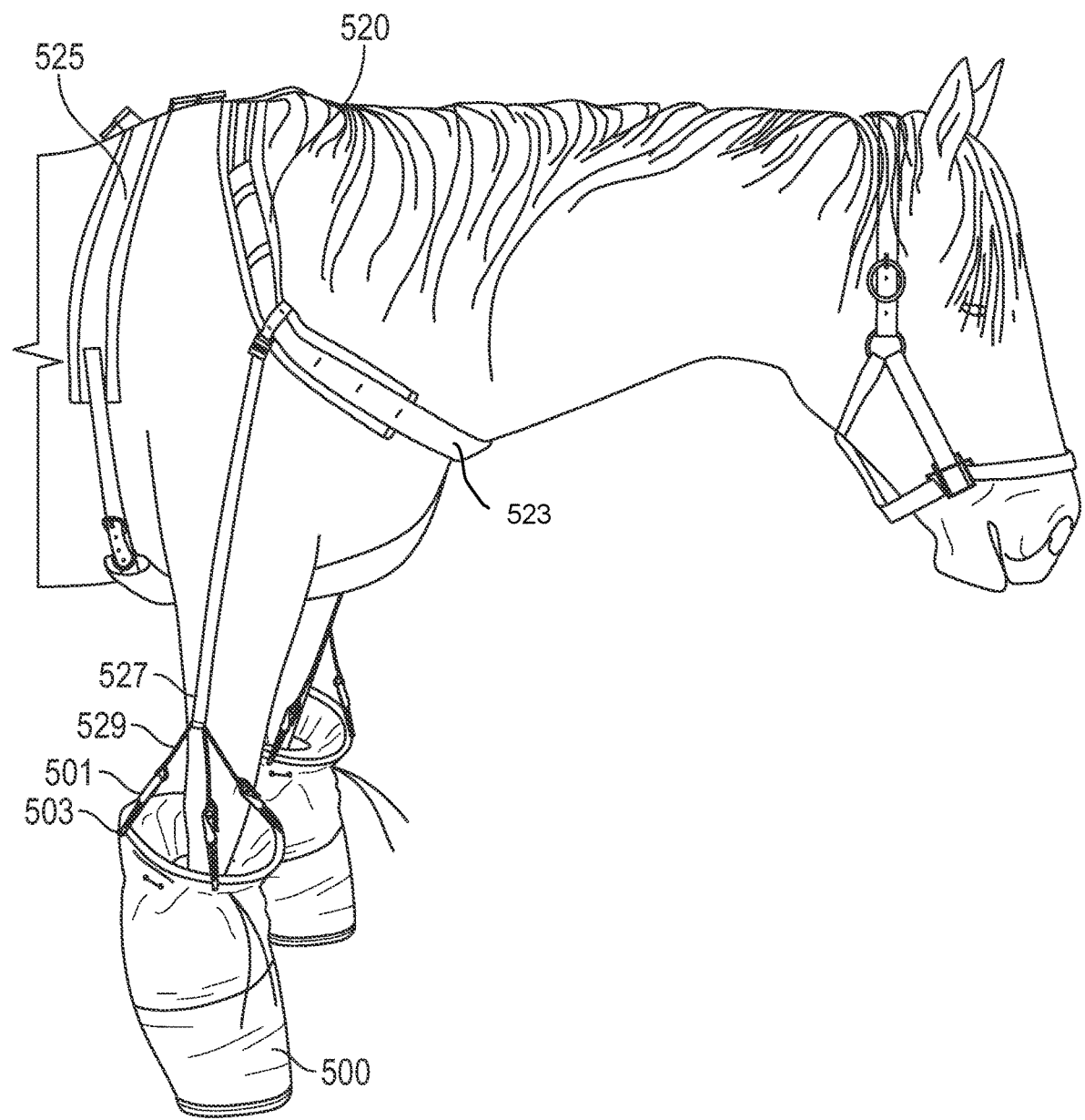
FIG. 5 is another embodiment of an ice boot support or harness system.

An example of a shoulder harness of this type is shown in FIG. 5, wherein the boot 500 is equipped with loops 503 and hooks 501. Harness 520 can be any harness, but here shown harness 520 has a neck strap 523 and girth strap 525 for securing to the horse. Hanging from harness 520 are boot straps 527 ending in elastic straps 529 that are caught by hooks 501. These boot straps can be added to any existing harness, or a specialty device with all components can be designed and sold.

To fit the equine leg into the ice boot, the sides of the flexible fabric boot with orthotic pad already in place are pushed down to bunch at the bottom of the boot. Slightly conical boots will allow the walls to be fully crushed as upper boot fabric lies to the outside of lower boot fabric. Then the leg is guided into the boot and the ankle collar is closed. The boot reservoir is pulled up and attached to the boot straps on the harness. Once suspended, it is filled with coolant, and if available an air pump is connected to the port and also hung from the harness.

Figure 6:
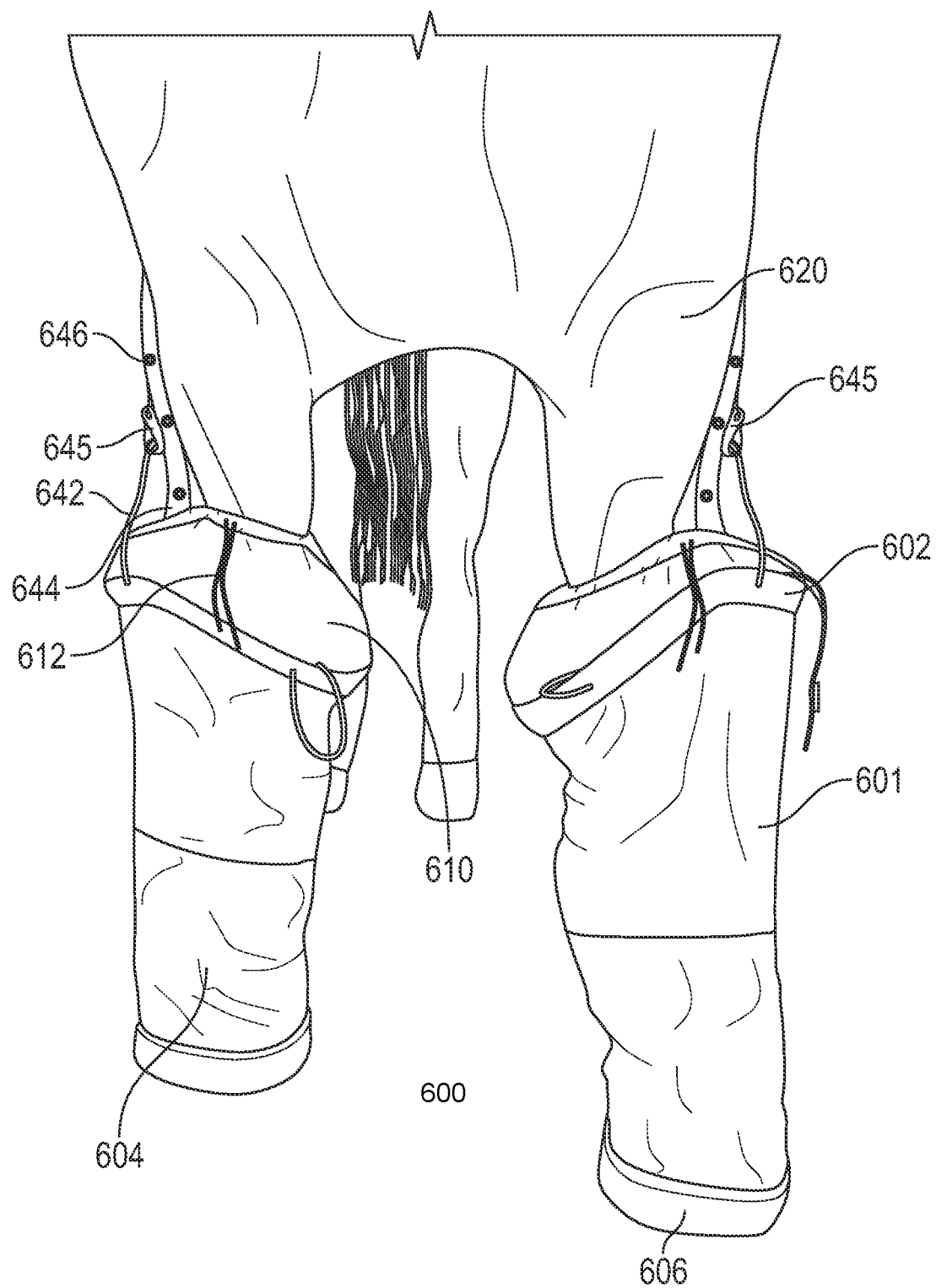
FIG. 6 is another embodiment of an ice boot with a region of fabric above the rim that can be tightened to minimize fluid loss.

FIG. 6 shows another embodiment of boot 600, with upper section 601, lower section 604, sole plate 606. Rim 602 is reinforced holds attachment means 642 that loops through hook 645. Sewn to the top of the boot is additional lighter weight panel 610 having drawstring 612 that allows panel 610 to be gathered and pulled tighter to the leg to minimize spillage. Boot strap 644 with holes 646 and hooks hole the boot up via loops 642.

Optionally, sea salt and/or magnesium salt is added to the coolant in the reservoir. Sea salt contain a number of elements other than sodium chloride that are beneficial in the spa treatment including potassium, calcium, chlorides and bromides. Moreover, the source of sea salt is important in selection of trace minerals. For example, it is reported that waters from the Dead Sea are unique in that they contain 27% of various salts as compared to 3% in normal sea water. Further, while sodium accounts for approximately 80% of the salt content of normal sea water, it comprises much less of the salt total in water from the Dead Sea. The balance of the salts in Dead Sea water is magnesium, potassium, calcium, chlorides and bromides. Sea salt from various sources and with varying amounts of minerals are available commercially. Magnesium salts that are soluble in water are also available. Magnesium sulfate and magnesium chloride are useful. As with sea salt magnesium salts from different natural sources are also available.

In general, it is desirable that the salt concentration be about twice that of sea water. A concentration of about 0.2 pounds of sea salt and 0.3 pounds of magnesium salt has been shown to be effective. Since the effectiveness of the osmotic effect of the minerals is determined by concentration (and temperature) optimum salt levels may be determined by simple experimentation. It is reported that concentrations of 2 and 7.5% sea salt in water is very effective in reducing pain and increasing mobility in human trials and it is assumed that the same is true of equine legs. See Machtey, Dr. I. 1982, Dead Sea Balneotherapy in Osteoarthritis, Proc. International Seminar on Treatment of Rheumatic Diseases. The salts may be prepackaged in the correct amount to add to a predetermined amount of water in the boot reservoir. Coolant temperatures of about 32-40° F. are desirable. Treatments (legs in coolant) of about 20-40 minutes have been found effective, but can go to 24, 36, 48 or 72 hours with or without breaks.

A short prototype of the boot assembly will contain about 2.25 gallons of coolant with an equine leg in the boot. A taller prototype holds about five (5) gallons. A suitable method of filling the boot is to fill the bottom of the boot to above the ankle (about one gallon in the prototypes) add salt and mix. Then add ice to fill the boot. Adding water first keeps the ice from lodging under the hooves (since ice floats) and allows better mixing and dissolution of the salts.

In the foregoing specification, the invention has been described with reference to specific embodiments thereof. It will, however, be evident that various modifications and changes can be made thereto without departing from the broader spirit and scope of the invention as set forth in the appended claims. The specification is, accordingly, to be regarded in an illustrative rather than a restrictive sense. Therefore, the scope of the invention should be limited only by the appended claims.

Each of the following are incorporated by reference in its entirety for all purposes.

U.S. Pat. No. 10,375,946 US2017290317 Reduced weight equine orthotic pad and method
US2015119772 Equine exercise boot assembly and ice spa
US2017280682 Equine exercise boot assembly and ice spa
U.S. Pat. No. 8,166,734 US2010095641 Equine cold therapy apparatus and method
U.S. Pat. No. 8,220,231 US2009032270 Equine boot
U.S. Pat. No. 8,291,683 Equine exercise boot assembly and method
U.S. Pat. No. 9,055,732 US2015156989 Equine ice boot
USD565256 Equine boot
USD616614 Equine boot
USD709656 Equine boot orthotic pad
USD743637 Equine ice boot
USD746519 Equine boot ridged orthotic pad
USD831900 Equine boot orthotic pad
USD831903 Equine boot orthotic pad with frog support
WO2006025864 Slip-on animal hoof boot assembly

The invention claimed is:

1. An ice boot, said ice boot sized and shaped to fit over a leg of an animal and comprising:
   a) a generally cylindrical and flexible water permeable reservoir for containing a coolant;
   b) said reservoir having attachment means at a top end thereof for attaching to a separate harness;
   c) a sole plate having a solid bottom and side walls circumnavigating said bottom;
   d) a bottommost surface of said reservoir or a bottom side surface of said reservoir or both surfaces of said reservoir being attached to an inner surface of said sole plate;
   e) a shock absorbing orthotic pad removably attached to an inner bottommost surface of said reservoir;
   f) wherein said reservoir is more permeable to water at a top end than at a bottom end; and
   g) wherein said reservoir comprises ultra-high molecular weight polyethylene (UHMWPE) and said bottom end is coated with a resin.

2. The ice boot of claim 1, said ice boot further comprising an ankle collar attached to a bottom side surface of said reservoir, said ankle collar configured to reversibly close around an ankle of said animal when said ice boot is in use.

3. The ice boot of claim 1, said ice boot further comprising a reinforced upper rim on said reservoir for supporting said attachment means.

4. The ice boot of claim 1, said ice boot further comprising a one-way port for connection to an air source low on an exterior surface of said ice boot.

5. The ice boot of claim 1, wherein said orthotic pad is at least ½ inch thick, and has a hardness of about 10 to 40 Shore A.

6. The ice boot of claim 1, wherein said reservoir comprises ripstop UHMWPE and said bottom end is coated with a polyurethane.

7. The ice boot of claim 1, said ice boot further comprising:
   a) an ankle collar attached to a bottom side inner surface of said reservoir, said ankle collar configured to reversibly close around an ankle of said animal when said ice boot is in use;
   b) a reinforced upper rim on said reservoir for supporting said attachment means;
   c) a one-way port for connection to an air source low on an exterior surface of said reservoir; and
   d) said reservoir comprises a ripstop UHMWPE fabric, having a top end and a bottom end, said bottom end being coated with a resin.

8. An ice boot, said ice boot sized and shaped to fit a leg of an animal and comprising:
   a) a conical reservoir being bigger at a top end for containing a coolant, said reservoir comprising a flexible water semi-permeable fabric;
   b) said reservoir having a top end and a bottom end coated with a resin, said top end of said reservoir being more permeable than said coated bottom end;
   c) a reinforced rim at a top end of said reservoir, said rim having attachment means for attachment to a separate harness;
   d) a sole plate having a solid bottom configured to fit under said animal's foot, said bottom having side walls circumnavigating said bottom;
   e) a bottommost surface of said reservoir or a bottom side surface of said reservoir or both surfaces of said reservoir being attached to an inner surface of said sole plate;
   f) a shock absorbing orthotic pad removably attached to a bottommost inner surface of said reservoir;

g) an ankle collar removably attached to a bottom side inner surface of said reservoir, said ankle collar configured to reversibly close around an ankle of said animal when said ice boot is in use; and h) a one-way port for connection to an air source low on an exterior surface of said reservoir.

9. The ice boot of claim 8, said fabric being UHMWPE.

10. The ice boot of claim 8, said fabric being ripstop UHMWPE.

11. The ice boot of claim 8, said fabric comprises ripstop UHMWPE, and wherein said bottom end is coated with a polyurethane.

12. An equine ice boot, said ice boot comprising a flexible reservoir for containing coolant attached to an inner surface of a solid sole plate and a shock absorbing orthotic pad reversibly attached to an inner bottommost surface of said ice boot;

a) said reservoir comprising:
   i) fabric side walls with an open top and having an upper section and a lower section, wherein said upper section is of wider diameter than said lower section such that said upper section can be folded down over said lower section;
   ii) wherein said lower section is coated with a resin and is less permeable to water than said upper section and said upper section is semi-permeable to water; and
   iii) wherein said upper section is reinforced near a top end thereof, and comprised fasteners or other means for attachment to a separate harness;

b) said sole plate comprising:
   i) a solid bottom and solid side walls; and
   ii) at least said fabric side walls being attached to an inner surface of said sole plate.

13. The ice boot of claim 12, wherein said fabric side walls are attached to a fabric bottom surface and said fabric bottom surface is attached to a top inner surface of said sole plate.

14. The ice boot of claim 12, wherein said fabric comprises UHMWPE.

15. The ice boot of claim 12, wherein said fabric comprises ripstop UHMWPE, and wherein said bottom end is coated with a polyurethane.

16. A method of treatment of a hooved animal leg with cryotherapy treatment, comprising fitting a leg of an animal that will benefit from cryotherapy treatment into the ice boot of claim 1, attaching said attachment means to a separate harness, and filling said ice boot ef with coolant comprising ice and optionally salt for sufficient time to cool said leg.

17. A method of treatment of a hooved animal leg with cryotherapy treatment, comprising fitting a leg of an animal that will benefit from cryotherapy treatment into the ice boot of claim 8, attaching said attachment means to a separate harness, and filling said ice boot with coolant comprising ice and optionally salt for sufficient time to cool said leg.

18. A method of treatment of a hooved animal leg with cryotherapy treatment, comprising fitting a leg of an animal that will benefit from cryotherapy treatment into the ice boot of claim 12, attaching said attachment means to a separate harness, and filling said ice boot with coolant comprising ice and optionally salt for sufficient time to cool said leg.

* * * * *

UNITED STATES PATENT AND TRADEMARK OFFICE
CERTIFICATE OF CORRECTION

| | | |
|---|---|---|
| PATENT NO. | : 12,433,254 B2 | Page 1 of 1 |
| APPLICATION NO. | : 18/597177 | |
| DATED | : October 7, 2025 | |
| INVENTOR(S) | : Monty L. Ruetenik | |

It is certified that error appears in the above-identified patent and that said Letters Patent is hereby corrected as shown below:

In the Claims

On Column 14, Line 45-47, of Claim 7 part d):
"d) said reservoir comprises a ripstop UHMWPE fabric, having a top end and a bottom end, said bottom end being coated with a resin."
Should read as:
---- d) said reservoir comprises a ripstop UHMWPE fabric. ----

On Column 14, Line 53, of Claim 8 part b):
"b) said reservoir having a top end and a bottom end coated"
Should read as:
---- "b) said reservoir having a bottom end coated" ----

On Column 16, Line 17, of Claim 16:
"harness, and filling said ice boot ef with coolant comprising"
Should read as:
---- "harness, and filling said ice boot with coolant comprising" ----

Signed and Sealed this
Eighteenth Day of November, 2025

John A. Squires
*Director of the United States Patent and Trademark Office*